Sept. 15, 1931.  A. A. YOUNG  1,823,246
METHOD OF TINTING FILM FOR USE IN SOUND REPRODUCTION
Filed Dec. 16, 1929
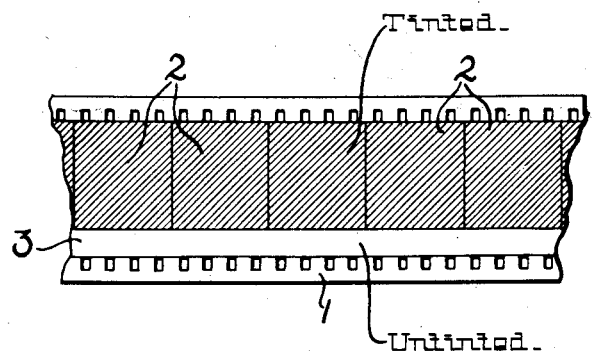
Inventor
Albert A. Young
By Newton M. Ferris
Attorney Patented Sept. 15, 1931

1,823,246

UNITED STATES PATENT OFFICE

ALBERT A. YOUNG, OF ROCHESTER, NEW YORK, ASSIGNOR TO EASTMAN KODAK COMPANY, OF ROCHESTER, NEW YORK, A CORPORATION OF NEW YORK

METHOD OF TINTING FILM FOR USE IN SOUND REPRODUCTION

Application filed December 16, 1929. Serial No. 414,404.

This invention relates to photographic film for the reproduction of motion pictures with sound accompaniment and the method of preparing the same.

It is the practice at the present time to tint motion picture film in order to present pleasing effects when the film is projected but many of the usual tints employed interfere with the reproduction of sound from the record carried by the film. It has, therefore, been proposed to tint only the picture areas of the film while leaving the sound record portion thereof untinted. However, the material used for tinting the film attacks the film support causing it to shrink. This difficulty makes itself manifest when the film is being dried after development inasmuch as it imparts a strong negative curl thereto. Such film also tends to buckle during projection inasmuch as the shrinkage is more prevalent in the tinted portion than in the untinted portion.

In accordance with the present invention it is proposed to treat the tinted portion of the support with material, in addition to the dye, which affects the support in such a way as to compensate for the shrinkage caused by the dye solvent.

For a clearer understanding of the invention reference is made to the drawing wherein there is represented a strip of motion picture film generally designated 1 having tinted picture exposure areas 2 and an untinted sound record area 3. The usual tint for the exposure areas 2, applied to the support side of the film, attacks the surface of and penetrates the support to such a distance that it is not dissolved by the usual chemicals employed in processing the film. Since this solvent attacks the portion of the support to which it is applied and therefore shrinks this part of the film while the sound record portion 3 which is untinted remains intact, it causes an unequal shrinkage after development and imparts to the film a strong negative curl. The shrinkage of the support also causes it to buckle during projection inasmuch as the shrinkage is predominant in the tinted portion of the film.

I have found that this shrinkage can be inhibited by the addition to the dye solution, which generally consists of a solvent or solvent mixture for the film base and the dye, such for example as methyl alcohol, acetone, ethyl acetate, etc., of one or more of the following groups of the conditioning agents. The following flash solvents may or may not be included among the dye and film base solvents above described:

Acetone
Methyl ethyl ketone
Methyl formate
Methyl acetate
Methylene chloride
Methyl alcohol
Ethyl formate
Ethyl acetate
Ether
Amylene The above mentioned flash solvents appear to carry the dye only a shallow distance into the film base and while they evaporate quickly they appear to sear over the surface of the film base to which they are applied.

The following non-solvents may or may not be added to the dye or film base solvent in amounts insufficient to cause preciptation of the ingredients:

Ethyl alcohol
Isopropyl alcohol.
Benzyl alcohol
Butyl alcohol
Phenyl ethyl alcohol
Phenyl propyl alcohol
Chloroform
Carbon tetrachloride
Ether
Benzine
Petroleum ether or naphtha
Benzene
Toluene
Xylene
Water The above mentioned non-solvents give certain beneficial results when used alone since they control evaporation and reduce the attacking power of the dye solvents which are used in impregnating the dye in the film support and keep the support from being attacked too deeply. These non-solvents when combined with certain of the mentioned flash solvents act as diluents to give effective results.

The following plasticizers may or may not be added to the dye and film base solvent described above:

> Amyl acetate
> Benzyl acetate
> Butyl acetate
> B-chloro ethyl acetate
> Ethylene glycol di acetate
> Cellosolve acetate
> Butyl cellosolve
> Methyl cellosolve
> Butyl propionate
> Ethyl lactate
> n-butyl lactate
> Methyl lactate
> Ethyl oxalate
> Diamyl phthalate
> Dibutyl phthalate
> Diethyl phthalate
> Tricresyl phosphate
> Triphenyl phosphate
> Cyclohexanol alcohol
> Diacetone alcohol
> Tetrahydrofurfuryl alcohol
> Ethyl oxybutyrate
> Cellulose acetate
> Cellulose nitrate
> Camphor
> Mesityl oxide
> Monochlornaphthalene
> Monoacetin
> Triacetin
> Paraffin The mentioned plasticizers, when used singly or sometimes in combinations of several, are effective to prevent the shrinking action since they remain on the support after drying and effect the support in such a way as to compensate for the shrinkage caused by the dye solvent. Certain of these plasticizers, when combined with certain of the flash solvents and non-solvents mentioned above, give highly desirable results.

While cellulose acetate and cellulose nitrate are not usually referred to as plasticizers, they act as such when introduced into the mentioned solution.

The materials mentioned in the three different groups above, which have been found effective in use, are representative of many others having similar characteristics suitable for this purpose.

I have found that each of the mentioned flash solvents when used alone with a dye in solution is especially helpful in preventing shrinkage of the film. Acetone or methyl alcohol may be used with any one of the remaining flash solvents mentioned to give this highly desirable result. In addition acetone and methyl alcohol together may be combined with any one of the remaining flash solvents mentioned to give this desired effect.

Each of the mentioned non-solvents may be combined with methyl alcohol or with acetone to prevent shrinkage of the film support while chloroform, ether, ethyl alcohol, isopropyl alcohol and toluene may be used alone for this purpose.

As an example of the use of a non-solvent with a flash solvent and a plasticizer useful with a film comprising cellulose acetate the following materials have been combined:

Methyl alcohol (non-solvent) 20%
Acetone (flash solvent) 75%
Nitrocellulose or cellulose acetate (plasticizer) 5%.

If ethyl alcohol be substituted for methyl alcohol in the above formula it will be useful for nitrocellulose film.

As an example of the use of the flash solvent alone either ether or chloroform up to about 25% of the dye solution may be used.

As further examples of the combination of these materials for use with cellulose nitrate film the following are given:

I. Acetone (flash solvent) from 5 to 10%
   Methyl alcohol (flash solvent) from 70 to 75%
   Triacetin (plasticizer) from 25 to 15%
II. Methyl alcohol (flash solvent) 50%
    Amyl acetate (plasticizer) 50%

It is to be understood that this invention is applicable particularly to film made from a plastic composition including the well known cellulose compounds and derivatives and particularly the esters. In general the disclosure above relates especially to films of cellulose acetate or cellulose nitrate. I consider my invention to include such equivalents and modifications as fall within the scope of the appended claims.

What I claim is:

1. The method of tinting the picture areas of a photographic film support in which the sound record portion is preserved untinted while preventing shrinkage of the support which comprises applying to the picture areas of said support a dye dissolved in a solution comprising a solvent for the support and the dye, and a non-solvent for the support which has the property of reducing the rate of evaporation of the solvent whereby the tendency of the support to buckle is eliminated.

2. The method of tinting the picture areas of a photographic film support in which the sound record portion is preserved untinted while preventing shrinkage of the support which comprises applying to the picture areas of said support a composition containing a dye, dissolved in a solution containing from 5 to 10% of acetone, from 70 to 75% methyl alcohol, and the remainder triacetin.

Signed at Rochester, New York, this 10th day of December, 1929.

ALBERT A. YOUNG.